March 12, 1957  E. B. MILLER  2,784,804
CYCLIC ADSORPTION PROCESS FOR REMOVING H$_2$S FROM NATURAL GAS
Filed May 6, 1955  6 Sheets-Sheet 1

INVENTOR
ERNEST B. MILLER

BY
ATTORNEYS

March 12, 1957     E. B. MILLER     2,784,804
CYCLIC ADSORPTION PROCESS FOR REMOVING $H_2S$ FROM NATURAL GAS
Filed May 6, 1955     6 Sheets-Sheet 3

INVENTOR
ERNEST B. MILLER

*Adams & Bush*
ATTORNEYS

March 12, 1957     E. B. MILLER     2,784,804
CYCLIC ADSORPTION PROCESS FOR REMOVING $H_2S$ FROM NATURAL GAS
Filed May 6, 1955     6 Sheets-Sheet 4

INVENTOR
ERNEST B. MILLER

BY
*Adams & Bush*
ATTORNEYS

March 12, 1957 E. B. MILLER 2,784,804
CYCLIC ADSORPTION PROCESS FOR REMOVING $H_2S$ FROM NATURAL GAS
Filed May 6, 1955 6 Sheets-Sheet 5

INVENTOR
ERNEST B. MILLER

BY
ATTORNEYS

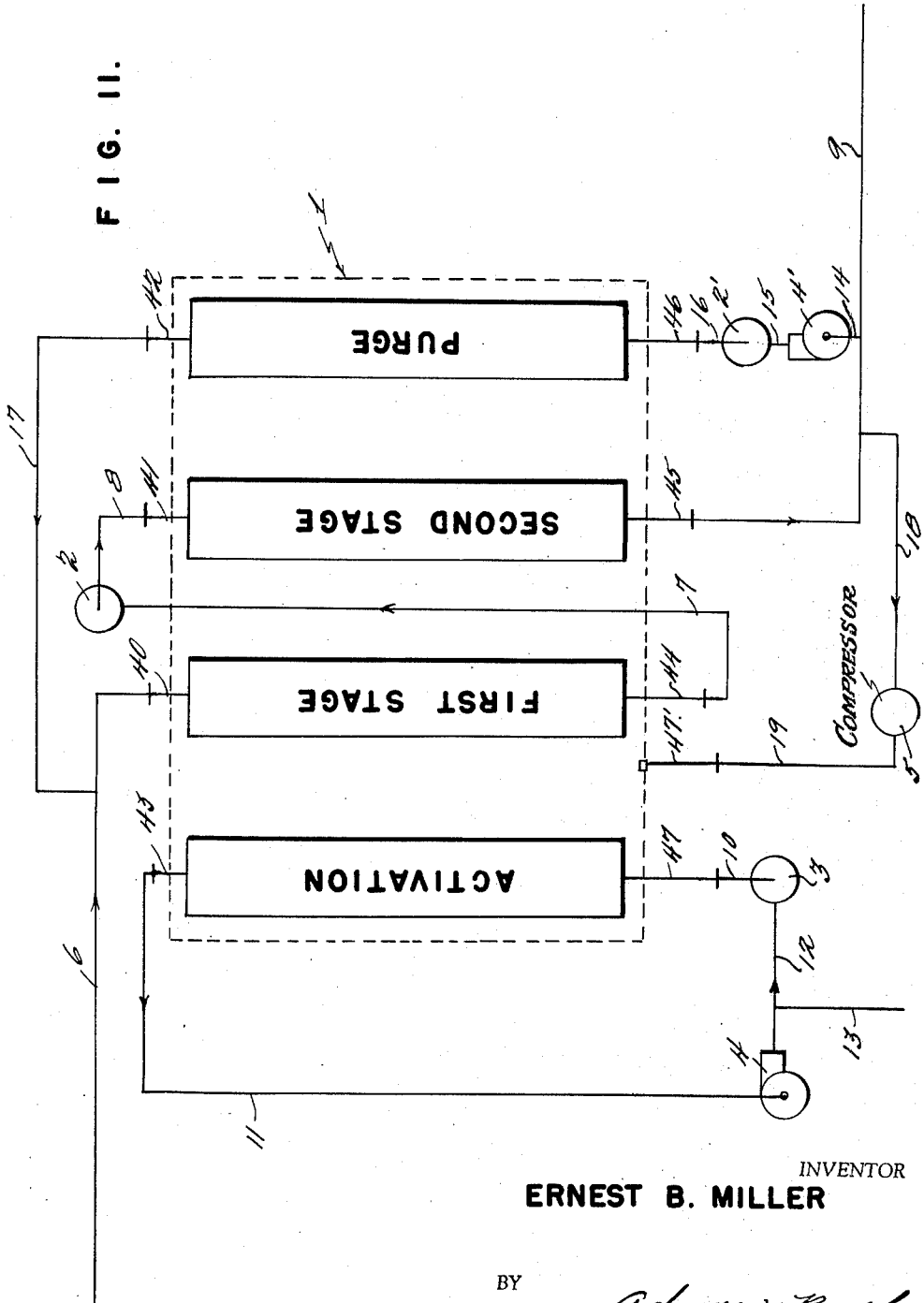

United States Patent Office 2,784,804
Patented Mar. 12, 1957

2,784,804

CYCLIC ADSORPTION PROCESS FOR REMOVING H₂S FROM NATURAL GAS

Ernest B. Miller, Houston, Tex., assignor to Jefferson Lake Sulphur Company, New Orleans, La., a corporation of New Jersey Application May 6, 1955, Serial No. 506,405

8 Claims. (Cl. 183—114.2)

This invention relates to processes of treating fluid to remove and/or recover particular constituents of the fluid and has more particular reference to the process of treating fluids under high pressure to remove and/or recover particular constituents of the fluid of the type involving maintaining a plurality of zones, each containing at least one bed of fluid treating material, in a pressure vessel, directing a continuous flow under pressure of the fluid being treated through at least one of said zones so that the particular constituent in the fluid to be removed will be deposited on said fluid treating material; directing a continuous flow of a heated activating fluid through another one of said zones to vaporize and remove the particular constituent of the fluid being treated which has been deposited thereon and activate the fluid treating material; and periodically shifting the relative position of the particular fluid treating material bed and the particular flow of fluid in each of said zones so that each zone in succession becomes an adsorption zone and a reactivation zone.

One object of the present invention is to provide an improved method of treating fluids under high pressure, as characterized above, which permits the effluent fluid that has been treated in the pressure vessel to remove a particular constituent therefrom to be substantially free of any contamination by the particular constituent by leakage during the passage of the fluid being treated through the pressure vessel.

Another object of the present invention is to provide an improved method, as characterized above, which prevents the contamination of the treated gas while passing through the various zones within said pressure vessel.

A further object of the present invention is to provide an improved method, as characterized above, wherein a small amount of the effluent treated fluid is withdrawn after its passage through the pressure vessel and has its pressure boosted so that it is equal to or slightly greater than the maximum pressure of the fluid being treated and introducing this withdrawn effluent fluid into the pressure vessel, so that if any leakage into any of the zones in the pressure vessel takes place, it will be a leakage of treated fluid, and thus the effluent stream of treated fluid from the pressure vessel will be protected against possible contamination.

A further and more limited object of the present invention is to provide an improved method of removing and recovering H₂S from sour natural gas and the prevention of contamination of the effluent treated natural gas by leakage between the sour gas and the treated gas during the process of removing the H₂S from the sour gas.

Other objects and advantages of the invention will appear in the following specification when considered in connection with the accompanying drawings, wherein:

Fig. 11 is a schematic view showing the course of the fluid being treated.

Figure 1:
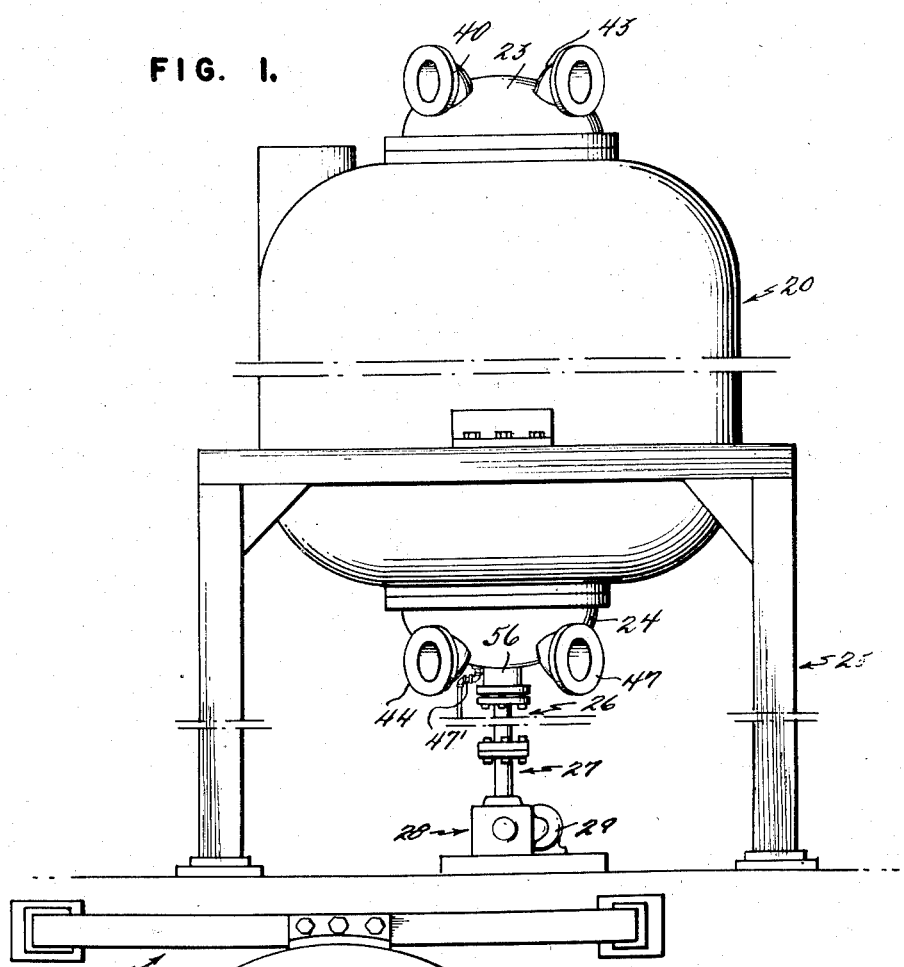
Fig. 1 is a side elevational view of one embodiment of fluid treating apparatus constructed in accordance with the present invention.

In general, the present invention comprises an improved method of treating fluids under high pressure to remove and/or recover particular constituents of the fluid involving maintaining a plurality of zones, each containing at least one bed of fluid treating material, in a pressure vessel, directing a continuous flow under pressure, of a heated activating fluid through at least one of said zones to vaporize and remove all of the particular constituent of the fluid being treated which has been deposited on the beds of fluid treating material therein; directing a continuous flow of the fluid being treated through the remainder of said zones so that the particular constituent in the fluid to be removed will be deposited on the fluid treating material therein; periodically shifting the relative position of the particular fluid treating material beds and the particular flow of fluid in each of said zones so that each zone becomes in succession and adsorbing zone and an activation zone; withdrawing a small amount of the effluent treated fluid after its passage through the pressure vessel and boosting the pressure of the withdrawn fluid so that it is equal to or slightly greater than the maximum pressure of the fluid being treated, and introducing the withdrawn effluent fluid into the pressure vessel so that if any leakage into any of the zones in the pressure vessel takes place, it will be a leakage of treated effluent fluid.

The invention particularly contemplates an improvement in the removal of H₂S from sour natural gas by treatment of the natural gas in a pressure vessel, as characterized above, and the prevention of leakage of the natural gas being treated into the effluent natural gas from the pressure vessel, thus preventing the contamination of the effluent gas.

While the improved process of the present invention may be employed in any fluid treating process in which it is essential or desirable that the effluent treated fluid be uncontaminated by leakage in the pressure vessel, it is particularly adapted to be employed in the removal and recovery of H₂S from sour natural gas and for the purpose of illustration, such a process will be described.

Referring now to the drawings, there is shown schematically in Fig. 11, one embodiment of apparatus and the arrangement thereof for carrying out the process of removing H₂S from sour natural gas in accordance with the present invention.

The apparatus shown includes a four-stage fluid treating apparatus in the form of an adsorber 1, the first and second stages of which are employed to adsorb the H₂S from the natural gas, the third stage is employed to reactivate the adsorbent material within the adsorber, and the fourth stage is employed to purge the adsorbent material in the adsorber; an intercooler 2, employed to cool the natural gas between the first and second adsorption stages; a cooler 2' for cooling the gas used for the purging medium; a heater 3 employed to heat the fluid used as the activation medium; a low pressure blower 4 for recirculating the activation gas through the reactivation stage of the adsorber; a blower 4' for circulating the purging medium through the purging stage of the adsorber; and a compressor 5 for compressing a portion of the effluent natural gas after it has been treated in the pressure vessel and forcing it back into the shell of the pressure vessel.

The natural gas being treated, preferably after being dehydrated and having all of its condensable hydrocarbons removed therefrom, is delivered, at high pressure, to the first stage of the adsorber by means of a pipe line 6. After passing through the first stage of the adsorber, during which passage some of the H₂S was removed, the gas passes through pipe line 7 into the intercooler 2. From the intercooler, the cooled gas passes through pipe line 8 into the second stage of the adsorber, where the remaining H₂S is adsorbed by the adsorbent beds therein, and from the second adsorption stage the effluent gas passes through pipe line 9 to its various points of use.

The removal and recovery of the H₂S from the beds of adsorbent material are effected in the third or activation stage of the adsorber. The activation gas, a captive H₂S, is heated in the heater 3, where its temperature is raised to from 250° F. to 400° F. From the heater, the heated activation gas passes through pipe line 10 into the activation stage of the adsorber and, as the hot activation gas passes through the adsorbent beds therein, the adsorbed H₂S contained therein will be removed and pass, with the heated activation gas, out of the adsorber and the adsorbent material will be reactivated for further use. After its passage through the activation stage of the adsorber, the heated activation gas, together with the H₂S removed from the adsorbent beds, passes through pipe line 11 back to the blower 4 and from the blower passes through pipe line 12 back to the heater 3 for recirculation through the adsorber. This recirculation process is continuous.

A portion of the H₂S gas is continuously withdrawn from closed recirculation path by means of pipe line 13 for passage to storage or to be sent to a converter for conversion to liquid elemental sulphur.

A portion of the effluent natural gas from the last adsorbing zone of the adsorber, is diverted from pipe line 9 for use as a purging gas. The purging gas passes, by means of pipe line 14, to the blower 4'; from the blower 4' the gas passes through pipe line 15 to the cooler 2', where it is cooled, and from the cooler passes through pipe line 16 into the purging stage of the adsorber. As the purging gas passes through the adsorbent beds, any remaining H₂S contained therein will be removed and pass, with the purging gas, out of the adsorber and the adsorbent beds will be purged. After its passage through the adsorber, the purging gas passes through pipe line 17 back to pipe line 6, where it is mixed with the natural gas to be treated on its way to the first adsorbing stage of the adsorber.

A portion of the effluent natural gas from the last adsorption stage is diverted from pipe line 9 and passes through pipe line 18 to the compressor 5, where its pressure is raised to a pressure equal to or greater than the pressure of the natural gas being treated as it enters the first adsorption stage of the adsorber and then is forced into the pressure vessel in which the adsorber is mounted, through pipe line 19.

While any suitable type of adsorber may be employed to practice the method of the present invention, the adsorber illustrated is generally similar to the fluid treating apparatus shown in my co-pending application Ser. No. 406,310, filed January 26, 1954, for Fluid Treating Apparatus, now Patent No. 2,751,033, granted June 19, 1956.

As shown in Figs. 1 to 10, inclusive, the adsorber, comprises an elongated upright cylindrical pressure vessel 20 having flanged vertically aligned circular openings 21, 22 in its top and bottom walls, respectively, closed by top and bottom flanged cover plates 23, 24 removably secured to cover said openings, as by bolting; suitable framework, indicated at 25, for supporting the vessel 20 in an upright position; a rotatable vertical shaft 26 extending through the pressure vessel 20 with its upper end journaled in a suitable cap bearing carried by the upper closure member 23 and with its lower end extending through a suitable shaft seal, secured to the bottom of the lower closure member 24; a vertical shaft 27 coupled to the bottom end of the shaft 26 and connected to suitable differential gearing indicated at 28, driven by a motor 29; a support disc 30 fixedly mounted on the shaft 26 for rotation therewith within said pressure vessel and providing support for a plurality of elongated fluid treating material containing cylindrical vessels 31; upper and lower distributive assemblages, indicated generally at 32, 33, each assemblage comprising an annular stationary member 34 having a plurality of compartments or manifolds formed therein, a tube sheet disc valve 35 slidably mounted on the shaft 26 for rotation therewith, a spring support disc 36 fixedly mounted on the shaft 26 and supporting a plurality of coiled springs 37 which engage the tube sheet disc valve 35 and tightly press it against the open end of the annular stationary member 34; a plurality of flexible pipes 38, each connecting the upper end portion of one of the vessels 31 and the tube sheet disc valve 35 of the upper distributive assemblage; a plurality of fixible pipes 39, each connecting the lower end portion of one of the vessels 31 and the tube sheet disc valve 35 of the lower distributive assemblage; a plurality of inlet-outlet conduits, four such being shown, 40, 41, 42 and 43, connected to the annular stationary member 34 of the upper distributive assemblage and extending upwardly through the upper cap closure member 23, for the ingress and egress of fluids to and from the upper stationary member 34; a plurality of inlet-outlet conduits, four such being shown, 44, 45, 46 and 47, connected to the annular stationary member 34 of the lower distributive assemblage, and extending downwardly through the lower cap closure member 24, for the ingress and egress of fluids to and from the lower stationary member 34, and an inlet pipe connection conduit 47' extending through the lower cap closure member 24 for the ingress and egress of fluids into the interior of the pressure vessel 20.

The cylindrical pressure vessel 20 and the cap cover members 23, 24 are preferably made of heavy boiler plate. The flanges formed on the peripheries of the openings 21, 22 of the vessel 20 and the peripheries of the cap cover members 23, 24 are preferably formed of heavy iron rings, rectangular in cross section, and are welded to the peripheral edges of the openings and the cover plates.

The shafting 26, preferably, and as shown, is formed of three sections, an upper section 48, an intermediate section 49, and a lower or bottom section 50. The upper and lower sections 48 and 50 consist of solid rod, round in cross section. The intermediate section 49 consists of a hollow pipe having an internal diameter considerably larger than the diameters of the upper and lower sections.

The upper section 48 has its upper end journaled in a suitable cap bearing 51 carried by the upper cover member 23 and its lower end supported in a support bushing 52 mounted in the upper end of the intermediate section 49 with a pin 53 passing through the two sections and the bushing for rigidly and detachably securing the two sections together.

The bottom section 50 has its upper end engaged in a support bushing 54 mounted in the lower end of the intermediate section 49 with a pin 55 passing through the two sections and the bushing for rigidly and detachably securing the two sections together, and with its lower end extending through the lower cover member 24 and a suitable shaft seal 56 and coupled to the upper end of the shaft 27.

The support disc 30 which supports the cylindrical vessels 31 is composed of two semi-annular flat pieces 57, the inner adjacent straight edges of which are provided with flanges which are bolted together to form the complete disc. This is to permit of assembling the disc within the pressure vessel 20.

The disc 30 (see Figs. 3 and 6) is fixedly secured, as by bolting, to a collar 58 fixedly secured to the intermediate section 49 of the shaft 26, so that the disc will rotate with the shaft. The outer peripheral edge portion of the disc 30 is supported by means of a plurality of supporting links or arms 59, each having its upper end bolted to one of a plurality of circumferentially spaced lugs 60 carried by a collar 61 fixedly secured to the intermediate section 49 of the shaft 26 and its lower end bolted to one of a plurality of circumferentially spaced upstanding lugs 62 secured to the upper surface of the disc 30.

Figure 3:
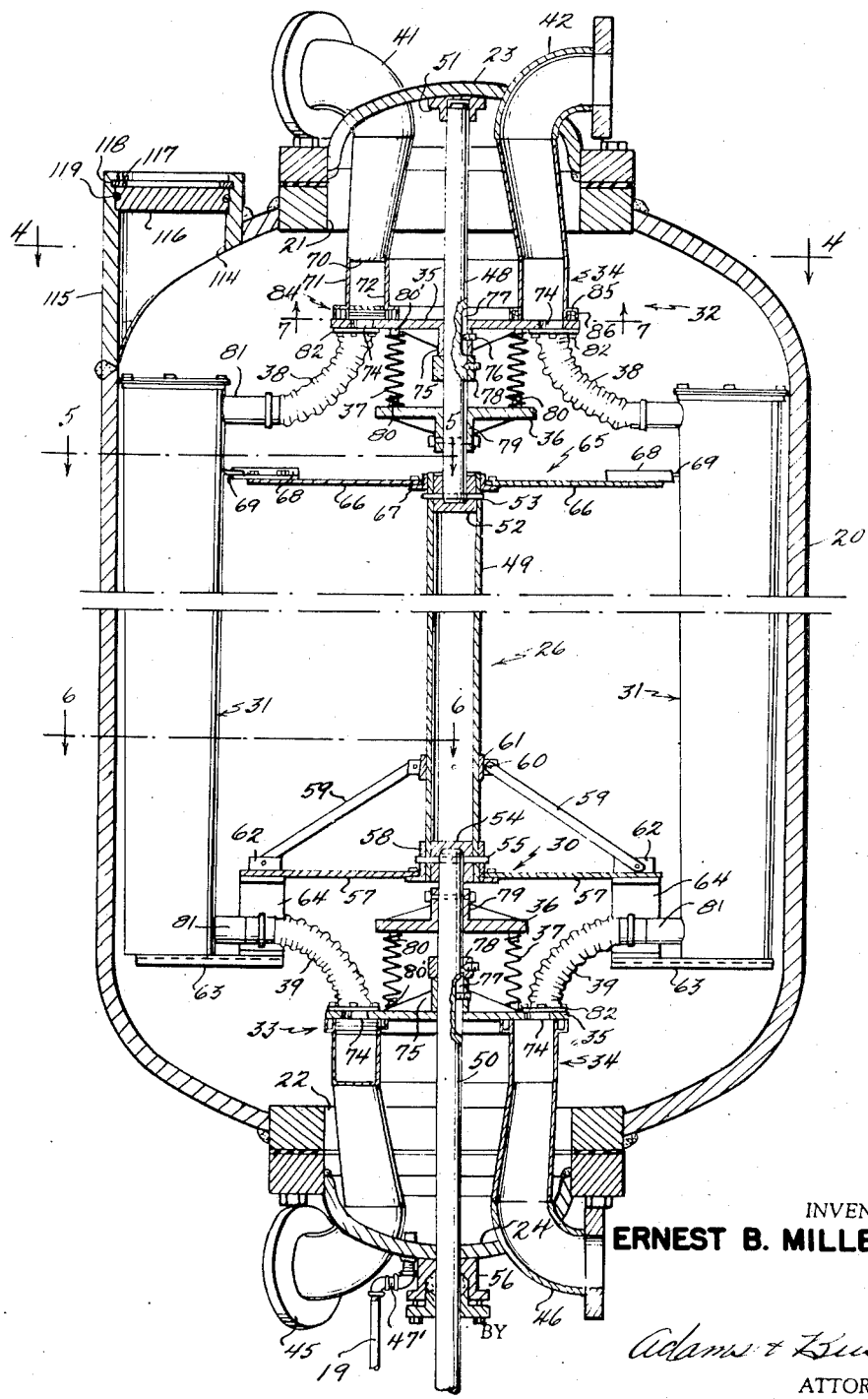
Fig. 3 is a vertical sectional view taken on the line 3—3 of Fig. 2, but omitting the driving apparatus.
Figure 4:
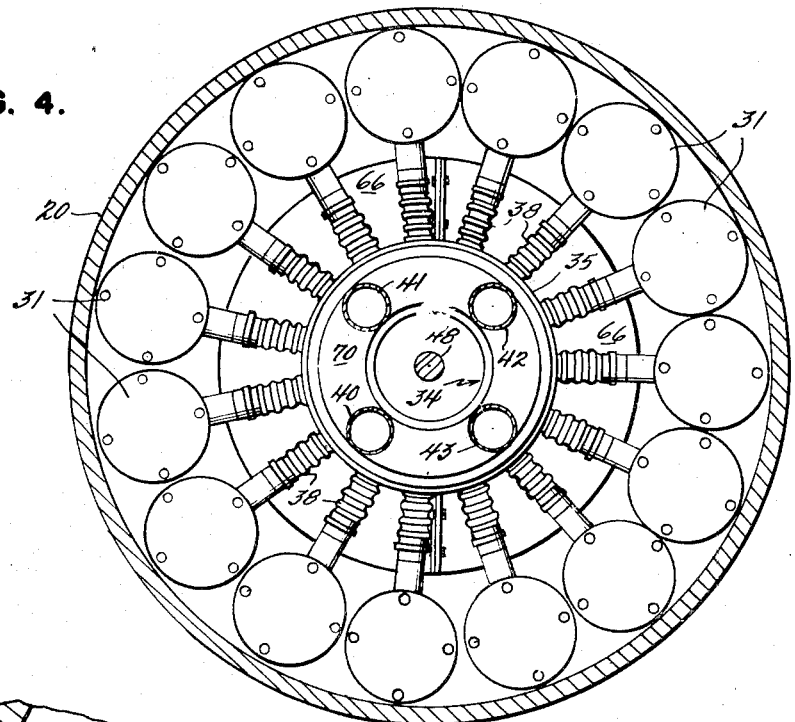
Fig. 4 is a horizontal sectional view taken on the line 4—4 of Fig. 3.
Figure 5:
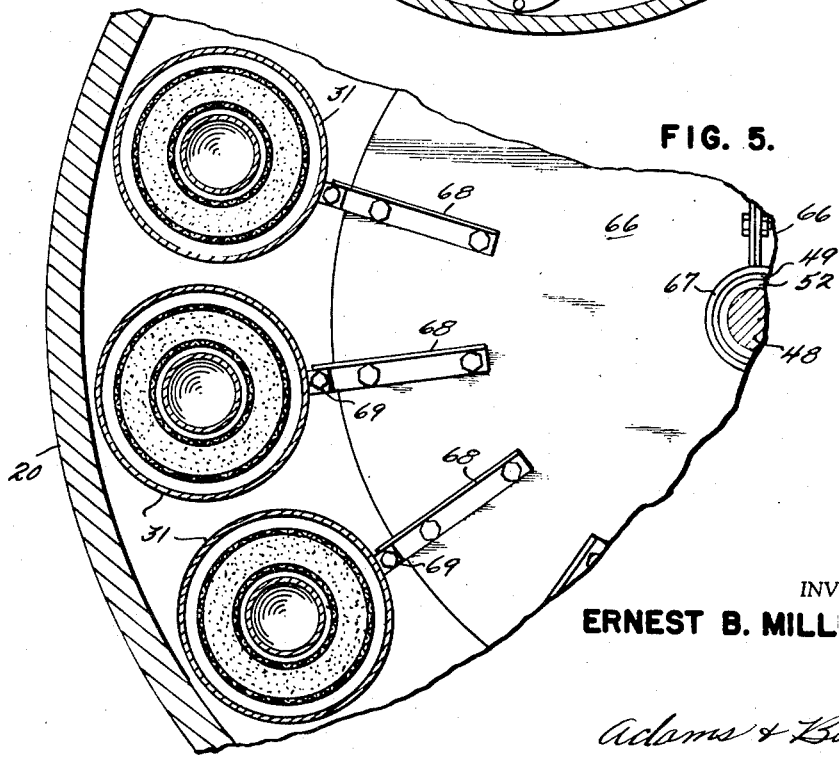
Fig. 5 is a fragmentary sectional view taken on the line 5—5 of Fig. 3, showing the manner of bracing the upper ends of the elongated fluid treating material containing vessels.
Figure 6:
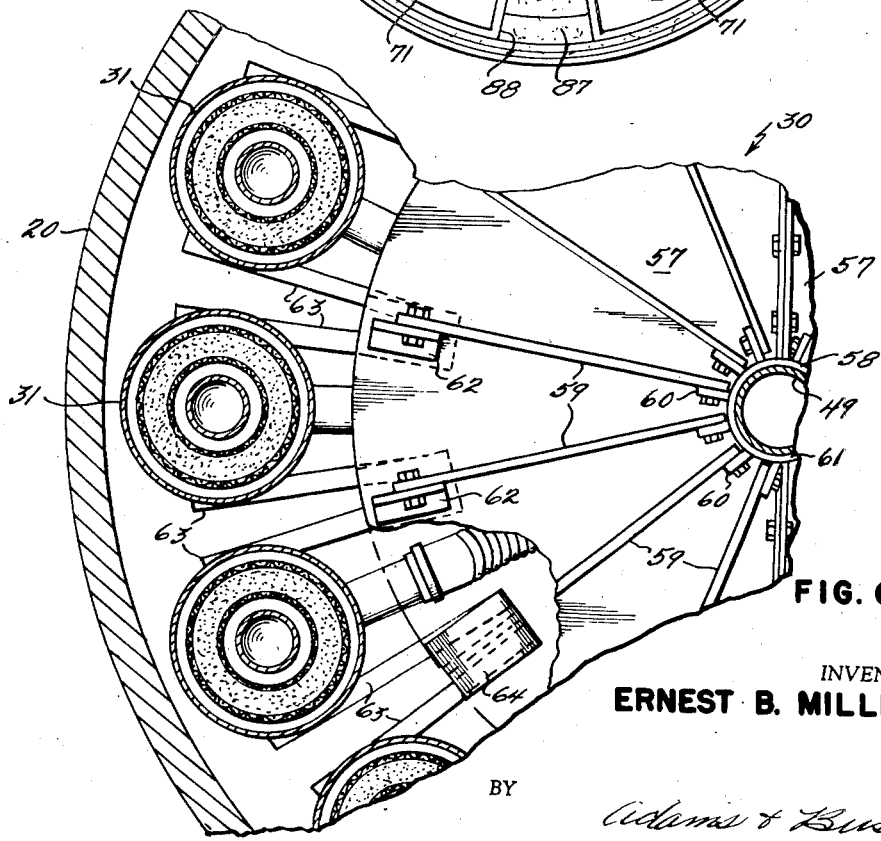
Fig. 6 is a fragmentary sectional view taken on line 6—6 of Fig. 3, showing the manner of supporting the lower ends of the elongated fluid treating material containing vessel.

The vessels 31 are supported by the disc 30, as by means of a plurality of supporting links or arms 63, in the form of short sections of structural angles, each arm 63 having its outer end portion fixedly secured to the bottom and one side of one of said vessels 31, as by welding, and its inner end portion fixedly secured, as by bolting, to one of a plurality of circumferentially spaced dependent lugs 64, in the form of short sections of I-beams welded to the under surface of the disc 30 (see Figs. 3 and 6).

Means may be provided for holding the cylindrical vessels 31 in their upright position encircling the shaft 26. In the particular embodiment of the invention illustrated, such means are shown as comprising a disc 65 composed of two semi-annular flat pieces 66, 66, the inner adjacent straight edges of which are provided with flanges which are bolted together to form the complete disc. This is to permit of assembling the disc within the pressure vessel 20. The disc 65 (see Figs. 3 and 5) is fixedly secured, as by bolting, to a collar 67 fixedly secured to the intermediate portion 49 of the shaft 26, so that the disc will rotate with the shaft. The upper end portions of the vessels 31 are held in their upright position by the disc 65, as by means of a plurality of bracing strips or arms 68 in the form of short sections of structural angles. Each arm 68 has its outer end bolted to a lug 69 welded on the outer surface of one of the vessels 31 and its inner end portion fixedly secured, as by bolting, to the upper surface of the disc 65.

The upper and lower distributive assemblages 32, 33 are identical in construction and, as shown in Fig. 3, each comprises an annular trough-shaped stationary member 34 having a plurality of compartments or manifolds formed therein; a tube sheet disc valve 35 slidably mounted on the shaft 26 for rotation therewith; and a spring support disc 36 fixedly mounted on the shaft 26 and supporting a plurality of coiled springs 37 which engage the tube sheet disc valve 35 and tightly press it against the open end of the annular stationary member 34.

Figure 8:
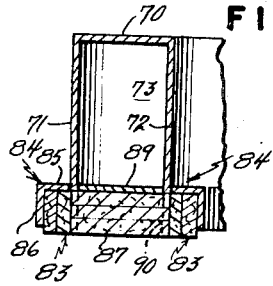
Fig. 8 is a detail sectional view on line 8—8 of Fig. 7.

The upper and lower annular stationary members 34 are identical in construction and, as shown in Figs. 3, 4, 7 and 8, each is formed in the shape of an annular trough having an annular top (or bottom) wall 70 and annular side walls 71, 72 (see Figs. 3 and 8).

The member 34 is divided into a plurality of compartments or manifolds as by means of a plurality of circumferentially spaced pairs of wall members 73 extending transversely of the member 34 and having their top (or bottom) and side walls welded to the top (bottom) and side walls of the member 34 to form gas-tight joints. Four such compartments or manifolds are shown and for the purposes of clarity of description designated manifolds $a$, $b$, $c$ and $d$ respectively.

The upper member 34 of the upper distributive assemblage 32 is held stationary relative to the rotation of the shaft 26 and the upper tube sheet disc valve 36 by the upper inlet-outlet conduits 40, 41, 42 and 43, which are welded to the upper cap closure member 23 and have their lower ends connected, as by welding, to the manifolds $a$, $b$, $c$ and $d$ respectively, in the upper member 34 to provide communication therewith.

The lower member 34 of the lower distributive assemblage is held stationary relative to the rotation of the shaft 26 and the lower tube sheet disc valve 35 by the lower inlet-outlet conduits 44, 45, 46 and 47, which are welded to the lower cap closure 24 and have their upper ends connected, as by welding, to the manifolds $a$, $b$, $c$ and $d$ respectively, in the lower member 34 to provide communication therewith.

The upper and lower tube sheet disc valves 35 are identical in construction and, as shown in Fig. 3, each comprises a flat metal disc having a plurality of circumferentially spaced circular openings 74 formed in a circular row adjacent its periphery. The disc is provided with a collar 75 having a plurality of radially extending reinforcing ribs welded to its bottom surface or cast integral therewith. The collar 75 is keyed on the upper (lower) section of the shaft 26 to have longitudinal movement therealong as well as rotative movement therewith, as by means of a set screw 76 slidably engaging in a longitudinal groove 77 formed in the upper (lower) section of the shaft 26. A second collar 78 is fixedly secured to the shaft 26 immediately beneath the collar 75 to limit the inward movement of the disc as it moves longitudinally of the shaft 26. The disc 35, as well as the collar 75, are loosely fitted on the shaft 26 so that the disc valve can be moved slightly to conform to any change in the plane of the engaged surface of the stationary member 34, due to unequal expansion and contraction.

The tube sheet disc 35 is so mounted on the shaft 26 that it slidably engages the open bottom (top) end of the annular stationary member 34 with the circular row of openings 74 vertically aligned with the manifolds $a$, $b$, $c$ and $d$, so that each manifold will be in communication with a group of the circular openings.

The upper and lower spring support discs 36 are identical in construction and, as shown in Fig. 3, each comprises a metal disc mounted on the shaft and having a hub 79 provided with a plurality of circumferentially spaced radial ribs or webs welded to the under face of the disc to strengthen it. The hub is fixedly secured to the shaft, as by a set screw. A plurality of vertically extending circumferentially spaced coiled springs 37 are interposed between the tube sheet disc valve 35 and the spring support disc 36. In order to insure that the springs 37 remain in proper position, they are mounted on and between short studs 80 extending upwardly from the disc 36 and short corresponding stubs 80' extending downwardly from the disc 36. The construction and arrangement is such that the springs 37 will keep the disc valve 35 evenly and firmly pressed into engagement with the under surface of the annular stationary member 34.

Figure 9:
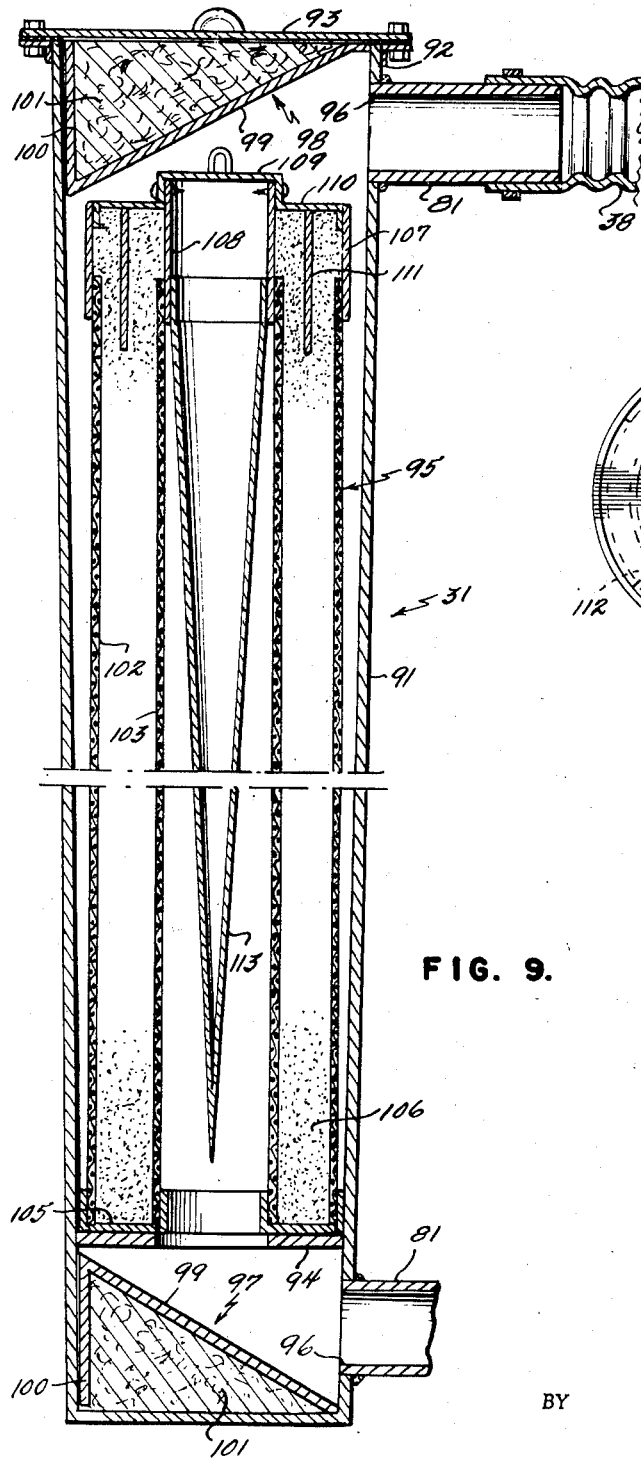
Fig. 9 is a vertical sectional view, with parts broken away, of the fluid treating material containing vessels shown in Fig. 3, showing the containers for holding the treating material mounted therein.

The upper and lower flexible pipes 38, 39 which connect the upper and lower end portions of the fluid treating material containing vessels 31 to the upper and lower distributive assemblages are identical in construction and, as shown in Figs. 3 and 9, each comprises a thin walled cylindrical metal tube having the greater portion of its wall formed in a sinuous shape to give it flexibility, the outer cylindrical end of each tube is detachably secured to a nozzle 81 formed on the upper (lower) end portion of the vessel 31, as by strapping. The cylindrical inner end of the tube is provided with an integral flange 82. The opening in the cylindrical inner end of the tube is aligned with one of the circular openings 74 formed in the upper (lower) tube sheet disc valve 35 and the flange 82 is detachably secured to the outer surface of the disc valve, as by countersunk bolts, so that the inner surface of the disc wall will be smooth and uninterrupted (see Fig. 3).

To prevent the escape of gas between the rotating tube sheet disc valve 35 and the manifolds in the member 34, sealing ring gaskets 83 are placed at the juncture of the side walls of the member 34 and the disc valve 35. The ring gaskets 83 are wedged into annular troughs 84, secured, as by welding, to the outer surface of the side walls of the member 34. Each trough comprises an annular top (bottom) wall 85 and an annular side wall 86. The ring gaskets 83, preferably and as shown, comprise a plurality of annular strips of packing, generally rectangular in cross section and made of any suitable material, such as teflon or silica impregnated asbestos.

Figure 7:
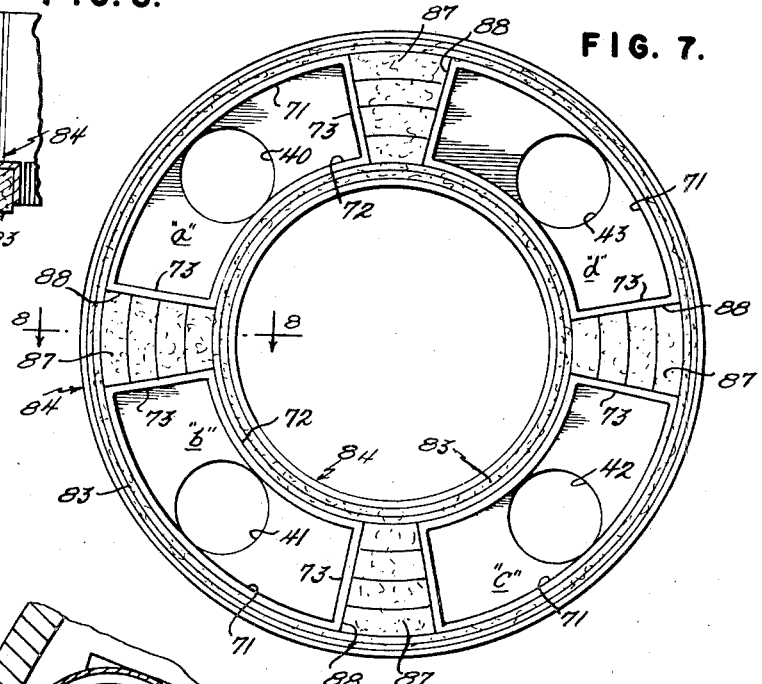
Fig. 7 is a horizontal sectional view taken on line 7—7 of Fig. 3.

The four manifolds $a$, $b$, $c$ and $d$ are sealed off from each other by means of cross seals 87, each sealed into a recess 88 formed by the adjacent end walls of the manifolds and a bottom plate 89 vertically spaced from the open end of the annular trough in which the manifolds are formed (see Figs. 7 and 8). Each cross seal is tightly wedged in its recess with its outer ends in tight engagement with the adjacent side walls of the annular seals 83 and with its bottom surface in sealing engagement with the upper (lower) surface of the tube sheet disc. In order for the outer ends of the cross seals to engage the adjacent side walls of the annular seals 83, the portions of the side walls 71 and 72 of the member 34 which extend between each pair of adjacent transverse members 73 are cut away, as indicated at 90, for a distance equal to the thickness of the seals 83 (see Fig. 8).

The widths of the manifolds $a$, $b$, $c$ and $d$ are substantially the same as the internal diameters of the circular openings 74 in the tube sheet disc 35, so that each cross seal can effectively seal off one of the openings.

Each of the openings 74 formed in the upper tube sheet disc 35 is in vertical alignment with a corresponding one of the openings 74 formed in the lower tube sheet disc 35 and each of the cross seals 87 which separate the manifolds $a$, $b$, $c$ and $d$ formed in the upper stationary member 34 is in vertical alignment with a corresponding one of the cross seals 87 which separate the manifolds $a$, $b$, $c$ and $d$ formed in the lower stationary member 34.

When the rotary disc valves 35 are stationary, the foregoing arrangement, in effect, divides the adsorbent material containing vessels 31 into four groups or stages, with one group connected to communicate with the manifold $a$, one group connected to communicate with the manifold $b$, one group connected to communicate with the manifold $c$, and one group connected to communicate with the manifold $d$, so that four separate, distinct and continuous flows of fluid may pass through the apparatus. Each flow enters the upper distributive assemblage by means of one of the inlet-outlet conduits 40, 41, 42 or 43, then passes through one of the groups or stages of vessels 31 into the lower distributive assemblage and out through one of the inlet-outlet conduits 44, 45, 46 or 47. As the upper and lower disc valves rotate, each of the flows of fluid will successively pass through the vessels 31.

Figure 10:
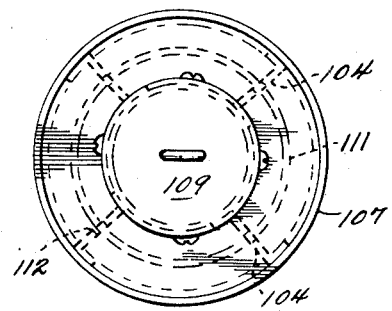
Fig. 10 is a plan view of the container shown in Fig. 9.

The fluid treating adsorbent material containing vessels 31 are identical in construction and, as shown in Figs. 9 and 10, each comprises an elongated hollow tubular member 91 having a closed bottom end and an open upper end provided with a flanged collar 92 to which is secured, as by bolting, a removable cover plate 93.

A horizontally disposed annular disc 94 is mounted in the lower end portion of the member 91 and secured therein, as by welding, to form a gas-tight joint between the outer peripheral edge of the disc and the side wall of the member 91. The lower annular disc 94 forms a support for an elongated annular fluid treating material container 95. The container 95 is removably mounted within the member 91, with its bottom end resting on the annular disc 94 and with the longitudinal open end of the container aligned with the opening in the disc.

The tubular member 91 has a tapered side wall for a purpose hereinafter to be described and is provided with upper and lower circular openings 96 in which are secured, as by welding, the nozzles 81 to which the upper and lower flexible pipes 38 and 39 are secured.

A baffle member 97 is mounted in the space between the bottom of the member 91 and the annular disc 94, and an upper baffle member 98 is secured to the underside of the lower plate 93 and is removable therewith. The upper and lower baffle members 97 and 98 are identical in construction and, as shown in Fig. 9, each comprises a generally elliptical-shaped flat sheet 99 extending upwardly (downwardly) from the bottom (top) of the member 91 to insure an even flow of fluid through the member 91; a side wall forming member 100; and insulating material 101 placed within the pocket formed by the members 99 and 100 and the bottom (top) wall of the member 91 (see Fig. 9).

The containers 95 are identical in construction and, as shown in Figs. 9 and 10, each comprises two concentric tubular screens 102, 103, held in spaced-apart relation by a plurality of longitudinal radial fins 104, with the annular space between the screens closed at the bottom, as by a flanged annular plate 105. The mesh of the screens is such as to retain a granular fluid treating material 106 in the annular space between the screens. In the instant case, the fluid treating material may be of any adsorbent having characteristics substantially like silica gel or the gel of other activated hydrous oxides. Preferably, silica gel is used.

Each of the containers 95 is closed at its top by means of concentric hoops or metal bands 107, 108 mounted on the concentric screens 102, 103, and a cover plate 109 detachably connected to the inner hoop or band 108, as by screws, and having a depending annular flange 110 fitting between the hoops or bands 107, 108. A depending cylindrical fin 111 is secured to the flange 110 and projects downwardly between and below the hoops or bands 107, 108, and fits in slits 112 formed in the upper ends of the radial fins 104, all as shown in Figs. 9 and 10. The construction is such that, as the silica gel settles down, leaving a space between the top portion of the wire screen devoid of silica gel, the fins 111 will prevent fluid from passing through the space.

Mounted within the inner wire screen 103 is an inverted substantially conically shaped baffle member 113. The baffle member 113 is closed at its apex which extends downwardly to a point near the bottom of the container and has its upper peripheral edge suitably secured to the band 108, as by welding. Preferably, the baffle member 113 is made of thin sheet metal.

When the container 95 is mounted within the hollow member 91, as shown in Fig. 9, the elongated annular space between the walls of the member 91 and the inverted conical baffle member 113 forms an elongated frusto-conically shaped duct which is annular in cross section. The annular container, filled with silica gel, is positioned in the duct between the members 91 and 113 in such manner that it forms a barrier extending longitudinally across the duct from top to bottom. The cross sectional areas of the duct at its top and bottom are substantially equal and the tapers of its side walls are such that a substantially uniform velocity is obtained on both sides of the barrier as fluid is transferred from the upstream to the downstream side, regardless of the direction of flow, thereby creating a substantially constant static head over the face of the barrier, resulting in a substantially uniform distribution of the fluid throughout the entire barrier area. Thus, it will be seen that by using the members 91 and 113 as baffle members, the entire area is made use of with resultant increase in efficiency, capacity and economy.

Means may be provided so that the containers 95 which hold the fluid treating material may readily be removed from and replaced in the vessels 31. As shown, such means may comprise an opening 114 formed in the top of the vessel 20 having a cylindrical member 115 welded therein and provided with a readily removable closure disc 116 secured in the upper end of the member 115, as by means of a split shear ring 117 bolted thereto and fitted into a circumferential recess 118 formed in the inner surface of the member 115, and an O-ring packing 119 mounted between the closure disc 116 and the side wall of the member 115 to insure gas tightness.

The manner in which the apparatus of the present invention is employed to remove $H_2S$ from natural gas and prevent contamination of the effluent treated gas by leakage within the pressure vessel, as well as the auxiliary apparatus required, is schematically shown in Fig. 11.

As there shown, the natural gas from which $H_2S$ is to be removed, is supplied under high pressure by pipe line 6 and enters manifold a of the upper distributive assemblage through inlet-outlet conduit 40. From manifold a the gas passes through openings 74 formed in the upper tube sheet disc valve 35 and flexible pipes 38 into the upper end portion of the group of vessels 31 which are at that time in communication with manifold a. The gas passes down through the silica gel beds therein into the bottoms of the vessels. The baffle members 113, in cooperation with the tapered side walls of the vessels 31, insure a substantially uniform flow and distribution of the gas through the silica gel beds, which adsorb some of the $H_2S$ content from the gas. From the bottoms of the vessels 31, the gas passes through outlet pipes 39 and openings 74 in the lower tube sheet disc valve 35 into the manifold a of the lower distributive assemblage. From the lower manifold a the gas passes through inlet-outlet conduit 44 and pipe line 7 into an intercooler 2, where it is cooled. The intercooler may be of the water circulating type. From the intercooler, the gas passes through pipe line 8 and inlet-outlet conduit 41 into manifold b of the upper distributive assemblage. From the manifold b the gas passes through openings 74 in the tube sheet disc valve 35 and inlet pipes 38 into the upper end portion of the group of vessels 31 which are at that time in communication with manifold b. The gas passes downwardly through the vessels 31 of the second group and through the silica gel beds therein into the bottom thereof. The remaining $H_2S$ content of the gas being adsorbed during its passage through the silica gel beds.

From the bottoms of the vessels 31 of the second group, the now stripped gas passes through outlet pipes 39 and openings 74 in the lower tube sheet disc valve of the lower distributive assemblage into the lower manifold b. From the manifold b the gas passes through inlet-outlet conduit 45 and pipe line 9 to the various points of use.

The removal and recovery of the adsorbed $H_2S$ from the beds of adsorbent material is effected in the third or activation stage. The activation gas, a captive $H_2S$ gas, is heated in a heater 3, where its temperature is raised to from 250° F. to 400° F. From the heater, the heated activation gas passes through pipe line 10 and inlet-outlet conduit 47 into the lower manifold d of the lower distributive assemblage. From the manifold d the hot activation gas passes through openings 74 in the lower tube sheet disc valve 35 and flexible pipes 39 into the lower end portion of the groups of vessels 31 which are at that time in communication with manifold d. The gas passes upwardly through the vessels 31 of the third group and through the silica gel beds therein into the tops thereof. As the hot gas passes through the adsorbent material it removes the $H_2S$ therefrom. From the tops of the vessels 31 the hot activation gas, together with the adsorbed $H_2S$ passes through flexible pipes 38 and openings 74 in the upper tube sheet disc valve 35 into the upper manifold d. From the upper manifold d, the hot gas passes through inlet-outlet conduit 43 and pipe line 11 to a fan or blower 4 and is recirculated by the blower through pipe line 12 and the heater 3 back through the activation stage. This recirculation process is continuous. A portion of the $H_2S$ is continuously withdrawn from its closed recirculating path by means of pipe line 13.

It is sometimes desirable to purge the silica gel beds after they have passed through the activation stage and this is accomplished in the fourth or purging stage.

While any suitable gas may be used as the purging medium, preferably, and as shown, the gas used for purging is provided by diverting a portion of the effluent natural gas from the last adsorption stage of the apparatus through pipe line 14, fan or blower 4', pipe line 15, cooler 2', pipe line 16, and inlet-outlet conduit 46 into the lower manifold c of the lower distributive assemblage. From the manifold c the purging gas passes through openings 74 in the lower tube sheet disc valve 35 and flexible pipes 39 into the lower end portions of the group of vessels which are at that time in communication with manifold c. The gas passes upwardly through the vessels 31 of the fourth group and through the silica gel beds therein into the tops thereof. As the purging gas passes through the adsorbent material it removes any remaining activation gas or deposited vapors therefrom, thereby purging the beds. From the tops of the vessels 31 the purging gas passes through flexible pipes 38 and openings 74 in the upper tube sheet disc valve 35 into the upper manifold c. From the upper manifold c the purging gas passes through inlet-outlet conduit 42 and pipe line 17 back into the flow of the natural gas being treated, preferably on the way to the first adsorption stage.

In order to prevent contamination of the effluent treated gas from the last adsorption stage of the adsorber by leakage between stages or zones within the pressure vessel, a portion of the effluent treated gas is diverted from pipe line 9 and passes through pipe line 18 to the compressor 5, where its pressure is raised to a pressure equal to or greater than the pressure of the natural gas being treated as it enters the first adsorption stage of the adsorber and then is forced through pipe line 19 and inlet conduit or connection 47' into the pressure vessel 20.

The natural gas being treated makes two passages through the groups of the silica gel containing vessels, while the heated $H_2S$ gas or reactivating medium and the purging medium each make a single passage through a group of the silica gel containing vessels. For convenience of description, the vessels which form the group through which the first adsorption passage is made is called the first adsorption stage, the group through which the second adsorption passage is made is called the second adsorption stage, the group through which the hot $H_2S$ gas used for reactivation passes is called the reactivation stage, and the group through which the purging medium passes is called the purging stage. Also, the pressure vessels are called zones in which either adsorption, reactivation, or purging takes place, depending upon the particular fluid flowing therethrough at a given time.

Figure 2:
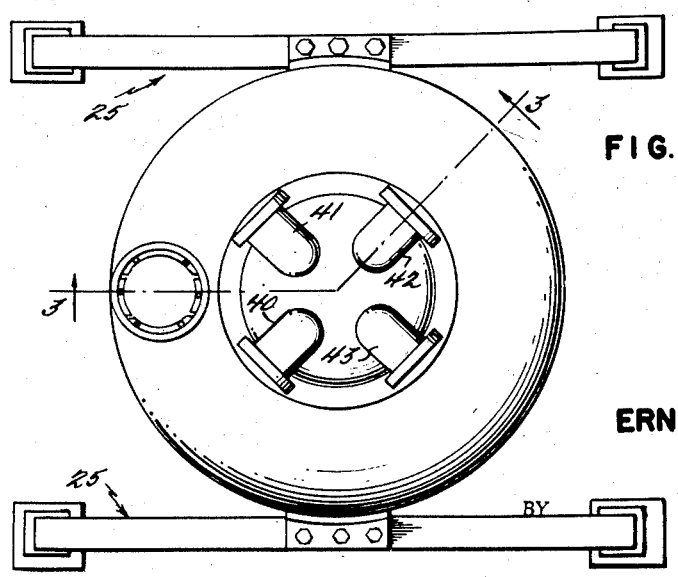
Fig. 2 is a plan view of the apparatus shown in Fig. 1.

In the particular embodiment of the invention illustrated, the valve discs 35 are rotated counterclockwise, as viewed in Fig. 2, and at the rate of 1 revolution every 10 minutes; thus, it will be seen that, as the valves rotate, each of the vessels 31 will be successively brought into communication with the manifolds d, c, b and a in the upper and lower distributive assemblages, so that each vessel 31 will, in turn, become an activation zone, a purging zone, a second adsorption zone and a first adsorption zone.

From the foregoing, it readily will be seen that there has been provided a novel and improved method of removing and/or recovering particular constituents from fluids; a method that has particular application in the treatment of natural gas to remove all H₂S therefrom so that the treated gas will be substantially free from H₂S.

Obviously, the present invention is not restricted to the particular embodiment thereof herein shown and described.

What is claimed is:

1. In the removal and recovery of H₂S from natural gas containing H₂S involving the contact of adsorbent material with the natural gas from which water vapor and condensable hydrocarbons have previously been removed therefrom with resultant adsorption of the H₂S by the adsorbent material and the subsequent treatment of the adsorbent material with a heated medium to vaporize and remove the H₂S and thereby reactivate the adsorbent material for further contact with the natural gas, the improvement which comprises providing at least one bed of adsorbent material in each of a plurality of zones within a pressure vessel; continuously by heating and recycling a flow of a gas consisting substantially of H₂S through at least one of said zones to remove the H₂S contained in the adsorbent material therein and reactivate the adsorbent material; directing a continuous flow of the natural gas through the remainder of said zones so that the H₂S content of the gas will be adsorbed by the adsorbent material therein; periodically shifting the relative position of the particular adsorbent material and the particular flow of fluid in each of said zones so that each zone becomes, in succession, a reactivation zone and an adsorption zone; continuously withdrawing a portion of the hot H₂S gas from the recycling path; and continuously withdrawing a small quantity of the effluent stripped natural gas after its passage through the last adsorption zone, compressing the withdrawn gas to a pressure greater than the initial pressure of the natural gas and forcing the compressed gas into said pressure vessel, whereby all of the zones therein will be entirely surrounded by said withdrawn effluent stripped gas and any leakage of gas into any of the zones will consist of stripped effluent natural gas.

2. In the removal and recovery of H₂S from natural gas containing H₂S involving the contact of adsorbent material with the natural gas from which water vapor and condensable hydrocarbons have previously been removed therefrom with resultant adsorption of the H₂S by the adsorbent material and the subsequent treatment of the adsorbent material with a heated medium to vaporize and remove the H₂S and thereby reactivate the adsorbent material for further contact with the natural gas, the improvement which comprises providing at least one bed of adsorbent material in each of a plurality of zones within a pressure vessel; continuously heating and recycling a flow of a gas consisting substantially of H₂S through at least one of said zones to remove the H₂S contained in the adsorbent material therein and reactivate the adsorbent material, continuously directing the flow of a purging medium through at least another one of said zones to purge the adsorbent material therein by removing all of the H₂S gas therefrom; directing a continuous flow of the natural gas through the remainder of said zones so that the H₂S content of the gas will be adsorbed by the adsorbent material therein; periodically shifting the relative position of the particular adsorbent material and the particular flow of fluid in each of said zones so that each zone becomes, in succession, a reactivation zone, a purging zone, and an adsorption zone; continuously withdrawing a portion of the hot H₂S gas from its recycling path; and continuously withdrawing a small quantity of the effluent stripped natural gas after its passage through the last adsorption zone; compressing the withdrawn gas to a pressure greater than the initial pressure of the natural gas, and forcing the compressed gas into said pressure vessel, whereby all of the zones therein will be entirely surrounded by said withdrawn effluent stripped gas and any leakage of gas into any of the zones will consist of stripped effluent natural gas.

3. The method as set forth in claim 2, wherein a portion of the flow of the natural gas from the adsorption zone is continuously diverted for use as the purging medium and wherein the flow of the purging medium after its passage through the purging zones is continuously directed back into the flow of the natural gas on its way to the adsorption zones.

4. In the removal of H₂S from natural gas containing H₂S involving the contact of adsorbent material with the natural gas from which water vapor and condensable hydrocarbons have previously been removed therefrom with resultant adsorption of H₂S by the adsorbent material and the subsequent treatment of the adsorbent material with a heated medium to vaporize and remove the H₂S and thereby reactivate the adsorbent material for further contact with the natural gas, the improvement which comprises rotating a series of separated thin beds of adsorbent material directly in succession and substantially continuously relative to and through an adsorption stage and a reactivation stage; continuously directing a flow of the gas to be treated through said adsorption stage; continuously heating and recycling a flow of a gas consisting substantially of H₂S through said reactivation stage to vaporize the H₂S contained in the bed of adsorbent material therein and reactivate the beds; and continuously withdrawing a portion of the H₂S gas from its recycling path.

5. The method as set forth in claim 4, wherein the series of beds of adsorbent material and the stages through which they are rotated are mounted within a pressure vessel and including the step of continuously withdrawing a small quantity of the natural gas after its passage through the adsorption stage, compressing the withdrawn gas to a pressure greater than that of the natural gas being treated and forcing the compressed gas into said pressure vessel, whereby all of the stages therein will be entirely surrounded by the compressed withdrawn gas and any leakage of gas into any of the stages will consist of the withdrawn compressed gas.

6. In the removal of H₂S from natural gas containing H₂S involving the contact of adsorbent material with the natural gas from which water vapor and condensable hydrocarbons have previously been removed therefrom with resultant adsorption of H₂S by the adsorbent material and the subsequent treatment of the adsorbent material with a heated medium to vaporize and remove the H₂S and thereby reactivate the adsorbent material for further contact with the natural gas, the improvement which comprises rotating a series of separated thin beds of adsorbent material directly in succession and substantially continuously relative to and through a reactivation stage, a purging stage and a succession of adsorption stages; continuously directing a flow of the gas to be treated in succession through said adsorption stage; continuously heating and recycling a flow of a gas consisting substantially of H₂S through said reactivation stage to vaporize the H₂S contained in the beds of adsorbent material therein and reactivate the beds; continuously directing a flow of a purging medium through the purging stage to remove any H₂S contained in the beds of adsorption material therein and purge the beds; and continuously withdrawing a portion of the recycling H₂S gas from its recycling path.

7. The method as set forth in claim 6, wherein a portion of the flow of the natural gas from the last of the adsorption stages is continuously diverted for use as the purging medium and wherein the flow of the purging medium after its passage through the purging stage is continuously directed back into the flow of the natural gas on its way to one of the adsorption stages.

8. The method as set forth in claim 6, wherein the series of beds of adsorbent material and the stages through which they are rotated are mounted within a pressure vessel and including the step of continuously withdrawing a small quantity of the natural gas after its passage through the last adsorption stage, compressing the withdrawn gas to a pressure greater than that of the natural gas being treated and forcing the compressed gas into said pressure vessel, whereby all of the stages therein will be entirely surrounded by the compressed withdrawn gas and any leakage of gas into any of the stages will consist of the withdrawn compressed gas.

References Cited in the file of this patent

UNITED STATES PATENTS

| | | |
|---|---|---|
| 1,998,774 | Bulkeley | Apr. 23, 1935 |
| 2,507,608 | Miller | May 16, 1950 |
| 2,519,874 | Berg | Aug. 22, 1950 |
| 2,709,496 | Baker | May 31, 1955 |